(12) United States Patent
Wiebrecht et al.

(10) Patent No.: US 8,904,856 B2
(45) Date of Patent: Dec. 9, 2014

(54) DIAGNOSTIC SYSTEM AND METHOD FOR A BEARING OF A CONNECTING ROD

(71) Applicant: Caterpillar Inc., Peoria, IL (US)

(72) Inventors: Eric D. Wiebrecht, East Peoria, IL (US); Ronald P. Maloney, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 29 days.

(21) Appl. No.: 13/890,471

(22) Filed: May 9, 2013

(65) Prior Publication Data

US 2014/0331754 A1 Nov. 13, 2014

(51) Int. Cl.
*G01M 13/04* (2006.01)
*G01M 15/06* (2006.01)

(52) U.S. Cl.
CPC .............. *G01M 13/04* (2013.01); *G01M 15/06* (2013.01)
USPC ...................................... 73/114.81

(58) Field of Classification Search
CPC .......... F16C 9/02; G01M 13/04; G01M 15/06
USPC ...................................... 73/114.81
See application file for complete search history.

(56) References Cited

U.S. PATENT DOCUMENTS

| | | | |
|---|---|---|---|
| 1,876,708 A | 9/1932 | MacPherson | |
| 3,246,640 A * | 4/1966 | Wagner et al. | 123/198 R |
| 4,632,223 A * | 12/1986 | Maurer et al. | 184/6.1 |
| 4,774,910 A | 10/1988 | Aihara et al. | |
| 4,878,761 A | 11/1989 | Duehrkoop | |
| 4,944,609 A * | 7/1990 | Salter et al. | 384/118 |
| 5,730,097 A * | 3/1998 | Aoyama | 123/196 R |
| 6,446,497 B1 * | 9/2002 | Glaser et al. | 73/114.57 |
| 6,561,121 B1 * | 5/2003 | Rose | 116/216 |
| 6,637,932 B2 * | 10/2003 | Badeer | 374/141 |
| 6,658,926 B2 * | 12/2003 | Mairhofer | 73/114.42 |
| 6,684,690 B2 * | 2/2004 | Mairhofer | 73/114.81 |
| 6,964,518 B1 * | 11/2005 | Jagtøyen | 374/154 |
| 6,973,908 B2 | 12/2005 | Paro | |
| 7,631,553 B2 * | 12/2009 | Heim et al. | 73/115.07 |
| 7,769,564 B2 | 8/2010 | Church | |
| 7,878,708 B2 | 2/2011 | Fritzer et al. | |
| 7,954,363 B2 * | 6/2011 | Friis-Knudsen | 73/114.57 |
| 2006/0131464 A1 * | 6/2006 | Hesser et al. | 246/169 D |
| 2007/0017280 A1 * | 1/2007 | Scull | 73/116 |

FOREIGN PATENT DOCUMENTS

| | | |
|---|---|---|
| DE | 102006042958 | 3/2008 |
| GB | 964951 | 7/1964 |

\* cited by examiner

*Primary Examiner* — Freddie Kirkland, III

(57) ABSTRACT

A system for determining a health of bearing associated with a connecting rod is provided. The system includes an oil collector placed proximate to the connecting rod and configured to receive an oil cast off from side thrust surfaces of the connecting rod during movement of the connecting rod. The system includes a sensor associated with the oil collector and configured to generate a signal indicative of a temperature of the oil cast off from the side thrust surface of the connecting rod. The system also includes a controller communicably coupled to the sensor. The controller is configured to receive the signal indicative of the temperature of the oil cast off from the side thrust surface of the connecting rod. The controller further determines the health of the bearing as a function of the signal of temperature of oil cast off from side thrust surface of the connecting rod.

20 Claims, 5 Drawing Sheets

DIAGNOSTIC SYSTEM AND METHOD FOR A BEARING OF A CONNECTING ROD

TECHNICAL FIELD

The present disclosure relates to a system and method for determining a health of a bearing of a connecting rod, and more specifically for detecting a failure of the bearing of the connecting rod.

BACKGROUND

A reciprocating internal combustion (IC) engine may include a connecting rod-crankshaft assembly including a bearing at a fork end of the connecting rod. This type arrangement allows for rotation of the crankshaft within the fork end of the connecting rod. The bearing forms a critical component of the connecting rod-crankshaft assembly.

During operation of the engine, the bearing associated with the connecting rod may undergo considerable friction. The friction may cause an increase in operating temperature of the bearing. In some situations, the increase in the operating temperature of the bearing may rise above a permissible threshold or faster than a permissible rate, causing overheating, and leading to failure of the bearing. Failure of the bearing in turn may cause irreparable damage to the connecting rod-crankshaft assembly, sometimes leading to a complete failure of the engine.

U.S. Pat. No. 4,774,910 discloses an engine cooling system for cooling an internal combustion engine. The system includes an oil temperature detector means for detecting a temperature of lubricating oil in the engine. The oil temperature detector means comprises an oil temperature sensor for detecting the temperature of lubricating oil to be supplied to an overhead camshaft. A lubricating oil supply means is provided for the overhead camshaft which has an oil ejector hole for continuously ejecting oil on the oil temperature sensor while the engine is running.

SUMMARY OF THE DISCLOSURE

In one aspect of the disclosure, a system includes a bearing associated with a connecting rod. The system further includes an oil collector placed proximate to the connecting rod and configured to receive oil cast off from a side thrust surface of the connecting rod during movement of the connecting rod. The system also includes a sensor associated with the oil collector and configured to generate a signal indicative of a temperature of the oil cast off from the side thrust surface of the connecting rod. The system includes a controller communicably coupled to the sensor. The controller is configured to receive the signal indicative of the temperature of the oil cast off from the side thrust surface of the connecting rod. The controller determines a health of the bearing as a function of the signal of the temperature of the oil cast off from the side thrust surface of the connecting rod.

In another aspect of the disclosure a method includes providing an oil collector proximate to the connecting rod. The method includes providing a sensor associated with the oil collector. The method also includes receiving an oil cast off from a side thrust surface of the connecting rod during movement of the connecting rod. The method includes generating, by the sensor, a signal indicative of a temperature of the oil cast off from the side thrust surface of the connecting rod. The method includes receiving, by a controller, the signal indicative of the temperature of the oil cast off from the side thrust surface of the connecting rod. The method further includes determining, by the controller, a health of the bearing as a function of the signal of the temperature of the oil cast off from the side thrust surface of the connecting rod.

In yet another aspect, the disclosure provides an engine housing. The engine housing includes a cylinder head. The engine housing includes an engine block having a cylinder. The engine housing includes a connecting rod and a bearing associated with the connecting rod. The engine housing includes an oil collector placed proximate to the connecting rod and configured to receive an oil cast off from a side thrust surface of the connecting rod during movement of the connecting rod. The engine housing also includes a sensor associated with the oil collector and configured to generate a signal indicative of a temperature of the oil cast off from the side thrust surface of the connecting rod. The engine housing further includes a controller communicably coupled to the sensor. The controller is configured to receive the signal indicative of the temperature of the oil cast off from the side thrust surface of the connecting rod. The controller further determines a health of the bearing as a function of the signal of the temperature of the oil cast off from the side thrust surface of the connecting rod.

DETAILED DESCRIPTION

Reference will now be made in detail to specific embodiments or features, examples of which are illustrated in the accompanying drawings. Generally, corresponding or similar reference numbers will be used, when possible, to refer to the same or corresponding parts.

Figure 1:
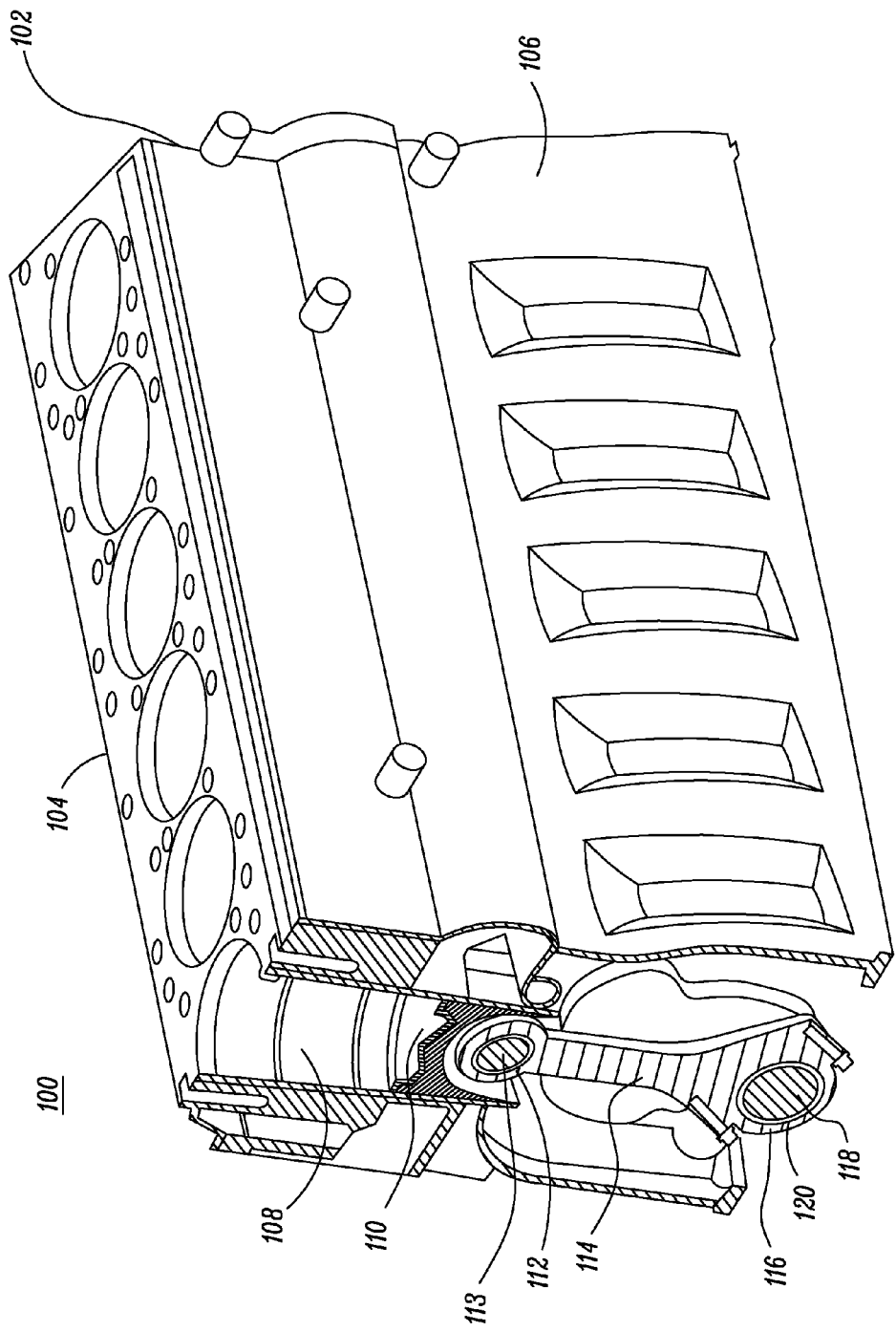
FIG. 1 illustrates an exemplary engine having an engine housing including a connecting rod and a bearing associated with the connecting rod.

Referring now to FIG. 1, an exemplary engine 100 is illustrated. More specifically, the engine 100 is a multi cylinder IC engine. The engine 100 may be powered by any one or a combination of known liquid or gaseous fuels including, but not limited to, gasoline, diesel, natural gas, petroleum gas and bio-fuels.

The engine 100 may include an engine housing 102. The engine housing 102 may include a cylinder head 104 and an engine block 106. The engine block 106 may include a plurality of cylinders 108. Each of the plurality of the cylinders 108 may be configured for housing a piston 110. The piston 110 may be configured to have a translatory movement within the cylinder 108. The piston 110 may be coupled to an eye end 112 of a connecting rod 114 by a gudgeon pin 113. A fork end 116 of the connecting rod 114 may be coupled to a crankshaft 118. The connecting rod 114 may be configured to convert the translatory movement of the piston 110 to a rotary movement of the crankshaft 118. A bearing 120 may be provided at the fork end 116 to allow rotation of the crankshaft 118 within the fork end 116 of the connecting rod 114.

Figure 2:
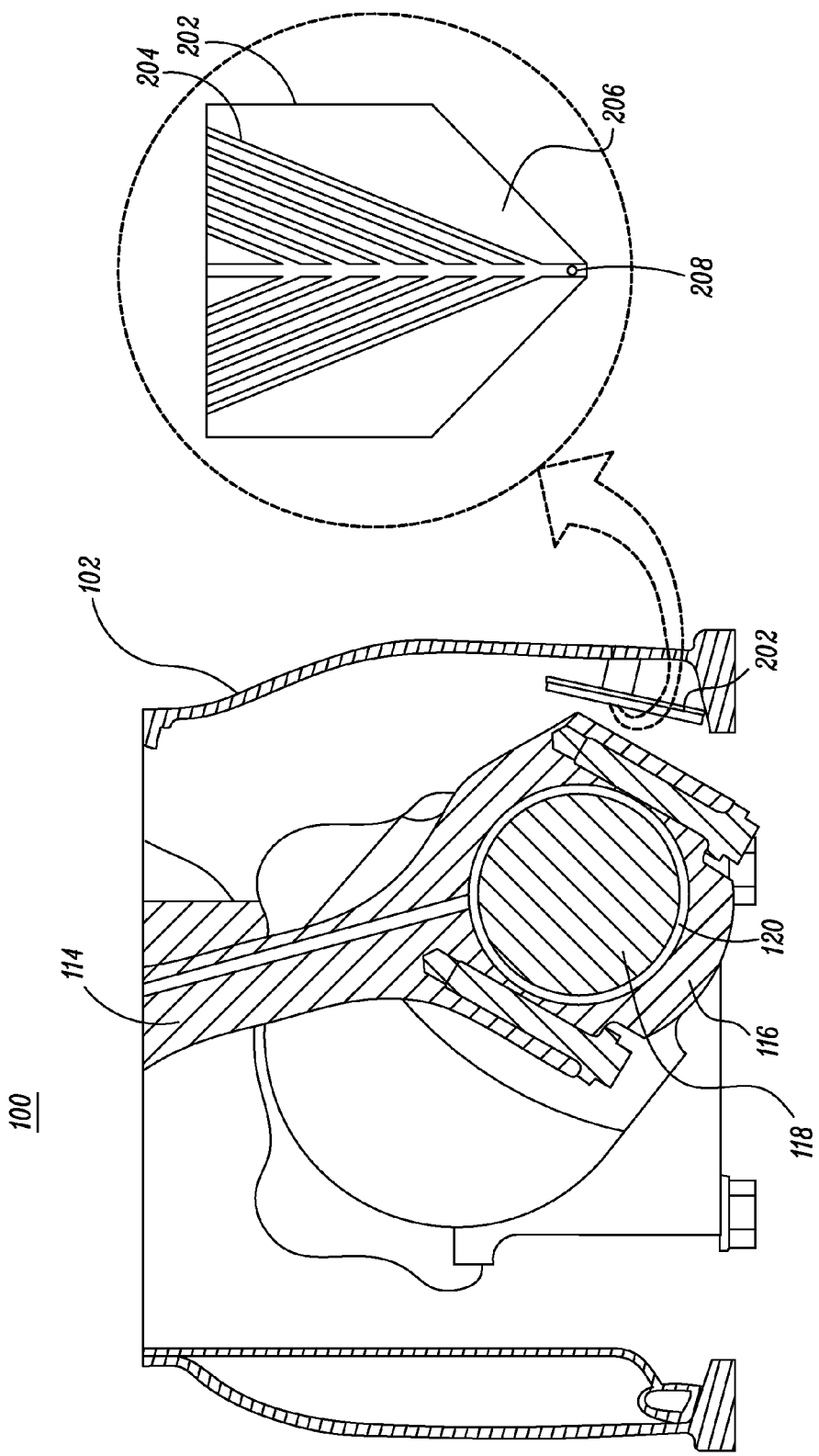
FIG. 2 illustrates a cross sectional view of an exemplary oil collector within the engine housing of FIG. 1.

During a downstroke and an upstroke movement of the connecting rod 114, oil present in and around the bearing 120 may be cast off from side thrust surfaces of the connecting rod 114. The oil cast off may be sprayed onto an inner surface of the engine housing 102, such that a number of lines of the oil cast off are painted in line with either side of the thrust face of the connecting rod 114. Referring to FIG. 2, an oil collector 202 may be mounted, within the engine housing 102, proximate to and in association with the connecting rod 114. The oil collector 202 may be affixed within the engine housing 102 by any known mechanical fastening methods including, but not limited to, welding, bolting, riveting, snapping and clamping. In one embodiment, the oil collector 202 may be integrally cast within the engine housing 102 during manufacture of the engine housing 102. The oil collector 202 may be made of any suitable metal known in the art.

More specifically, the oil collector 202 may be mounted proximate to the fork end 116 of the connecting rod 114. The oil collector 202 may be configured to receive the oil cast off from the side thrust surface of the connecting rod 114 during the downstroke movement of the connecting rod 114 and/or the piston 110. In one embodiment, the oil collector 202 may be provided within the engine housing 102 and proximate to the fork end 116 of the connecting rod 114 in order to receive the oil cast off from the side thrust surface of the connecting rod 114 during the upstroke movement of the connecting rod 114 or the piston 110. It should be noted that for the multi cylinder engine 100, a plurality of the oil collectors 202 may be provided in association with each of a plurality of the connecting rods 114. Moreover, the plurality of the oil collectors 202 may be provided on any one or both of the downstroke side and the upstroke side of the plurality of the connecting rods 114.

As shown in FIG. 2, the oil collector 202 may be configured as a flat plate like structure. The shape and dimensions of the oil collector 202 may be appropriately chosen in order to receive a maximum volume of the oil cast off from the side thrust surface of the fork end 116 of the connecting rod 114. The oil collector 202 may be positioned within and at a bottom section of the engine housing 102. Appropriate spacing may be provided between the fork end 116 of the connecting rod 114 and the oil collector 202 in order to avoid interference between the side thrust surface of the fork end 116 of the connecting rod 114 and the oil collector 202 during the movement of the connecting rod 114. Further, the oil collector 202 may be positioned at an inclination with respect to a surface of the engine housing 102 and in cooperation with the movement of the connecting rod 114 to receive the maximum volume of the oil cast off from the side thrust surface of the fork end 116 of the connecting rod 114.

The oil collector 202 may have a plurality of internal channels 204 formed on its surface. The plurality of internal channels 204 may be provided on a surface of the oil collector 202 which may face the side thrust surface of the fork end 116 of the connecting rod 114 in order to receive the oil cast off. The plurality of the internal channels 204 may be formed in a substantially parallel and spaced apart arrangement. Further, the plurality of the internal channels 204 may have a "V" shaped configuration or any other suitable configuration to converge the flow of the cast off oil towards a bottom section 206 of the oil collector 202 due to an action of gravity or other forces.

An aperture 208 may be provided at the bottom section 206 of the oil collector 202. A sensor 404 (shown in relation to FIG. 4) may be provided within the aperture 208 in a manner such that the sensor 404 may be in direct contact with the flow of the oil cast off and flowing towards the bottom section 206 of the oil collector 202. The sensor 404 may be configured to generate a signal indicative of a temperature of the oil cast off from the side thrust surface of the fork end 116 of the connecting rod 114. The sensor 404 may be any contact type sensor configured for temperature measurement. For example, the sensor 404 may be a thermocouple. Alternatively, any other contact type sensor configured for temperature measurement known in the art may also be utilized as per system design, requirements and compatibility.

The sensor 404 may be affixed to the engine housing 102 and/or the oil collector 202 by any known mechanical fastening methods including, but not limited to, welding, bolting, riveting, snapping and clamping. In one embodiment, threads may be provided on a body of the sensor 404 to enable the sensor 404 to be directly screw fitted on the engine housing 102 and/or the oil collector 202. A controller 402 (shown in relation to FIG. 4) may be provided in communication with the sensor 404 in order to determine a health of the bearing 120 based on the signal indicative of the temperature of the oil cast off generated by the sensor 404. The detailed working of the controller will be explained in connection with FIG. 4.

Figure 3:
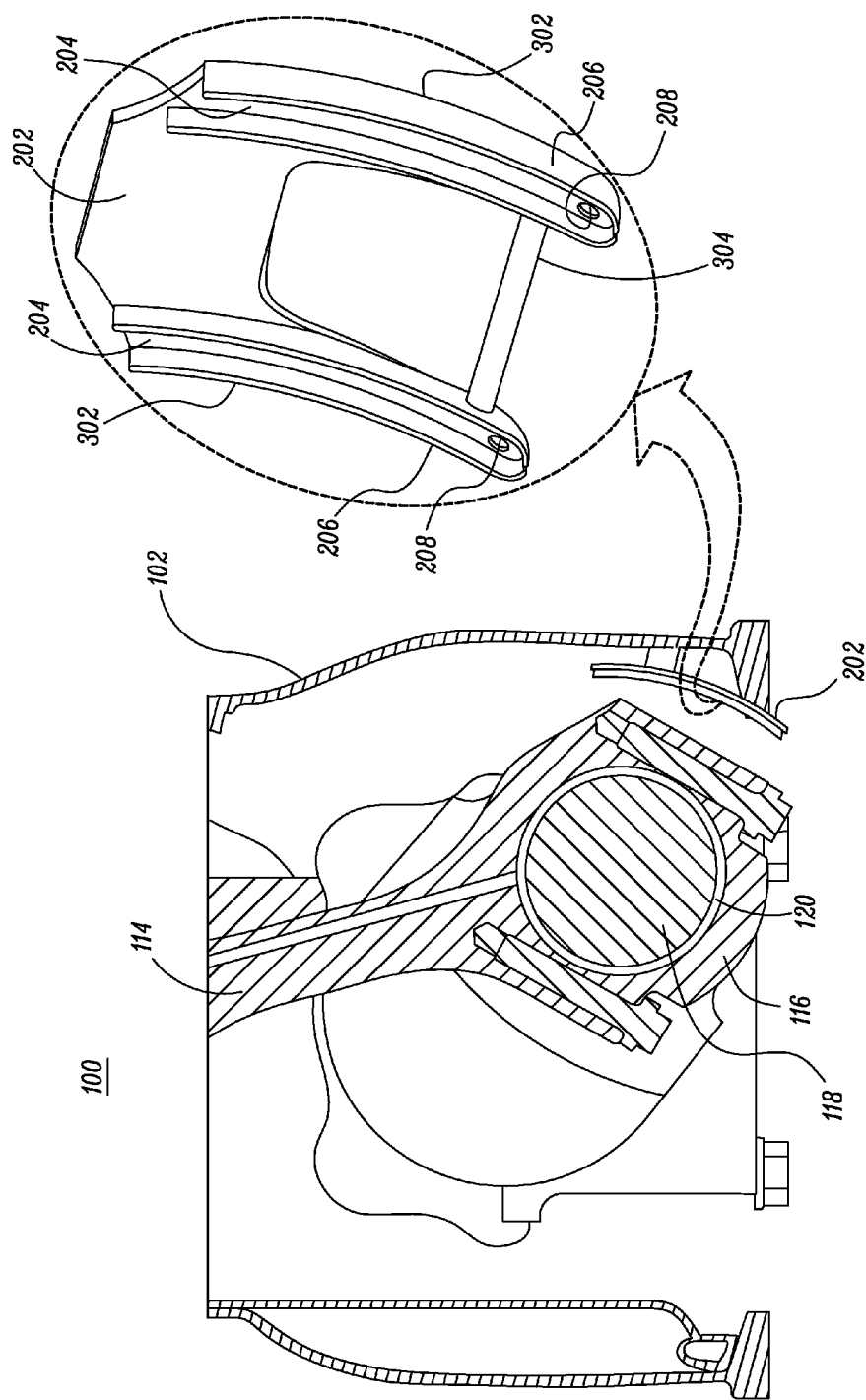
FIG. 3 illustrates a cross sectional view of another exemplary oil collector within the engine housing of FIG. 1.

Another embodiment of the oil collector 202 is illustrated in FIG. 3. As shown, the oil collector 202 may have a substantially curved configuration in cooperation with the movement of the fork end 116 of the connecting rod 114 to receive the maximum volume of the oil cast off from the side thrust surface of the fork end 116 of the connecting rod 114. Moreover, the oil collector 202 may have a fork like structure having a plurality of prongs 302. The plurality of the prongs 302 may be spaced apart from each other and may be associated with separate connecting rods 114 of the multi cylinder engine 100. A reinforcing member 304 may be provided between each of the plurality of the prongs 302 in order to give structural support to the prongs 302 of the oil collector 202.

Each of the plurality of the prongs 302 may be provided with the internal channel 204. The internal channel 204 may be configured to receive the oil cast off from the side thrust surface of the fork end 116 of the connecting rod 114. In the illustrated embodiment, the oil cast off and collected in the internal channels 204 may slide in a substantially downward direction towards the bottom section 206 of the respective prong 302 due to the force of gravity. The aperture 208 may be provided at the bottom section 206 of the prong 302. The sensor 404 may be provided in fluid communication with the oil cast off and positioned within the aperture 208 in a manner such that the sensor 404 may be in direct contact with the flow of the oil cast off flowing towards the bottom section 206 of the prong 302.

Figure 4:
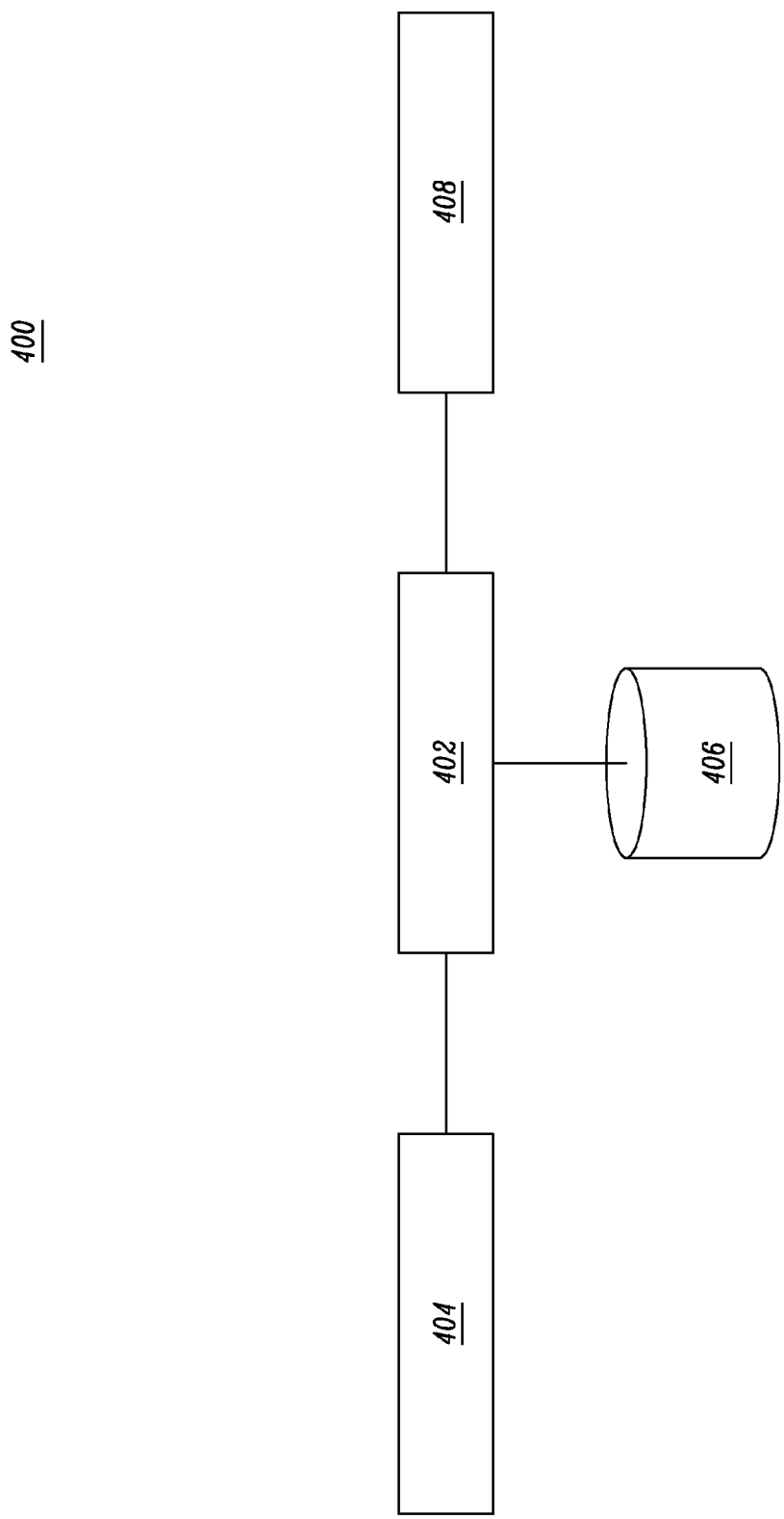
FIG. 4 is a block diagram of an exemplary health determination system for the bearing of FIGS. 1-3.

Referring now to FIG. 4, a health determination system 400 for the bearing 120 is illustrated. The health determination system 400 may include a controller 402 communicably coupled to the sensor 404. The controller 402 may be configured to receive the signal indicative of the temperature of the oil cast off from the side thrust surface of the fork end 116 of the connecting rod 114, from the sensor 404. The controller 402 may be configured to determine the health of the bearing 120 as a function of the signal indicative of the temperature of the oil cast off from the side thrust surface of the fork end 116 of the connecting rod 114. In one embodiment, the controller 402 may be configured to compare the temperature of the oil cast off with a predetermined threshold. It should be noted that the temperature of the oil cast off from the side thrust surface of the fork end 116 of the connecting rod 114 may be directly proportional to a temperature of the bearing 120 provided at the fork end 116 of the respective connecting rod 114. Based on the comparison made, the controller 402 may be configured to determine the health of the bearing 120. More specifically, the controller 402 may be configured to detect if the temperature of the bearing 120 exceeds the predetermined threshold, in order to determine an impending failure of the bearing 120. In other exemplary embodiments the controller 308 may be configured to determine the health of the bearing 120 as a function of the rate of change of temperature of the oil cast off from the side thrust surface of the fork end 116 of the connecting rod 114, or the second derivative of the temperature of the oil cast off from the side thrust surface of the fork end 116 of the connecting rod 114. In another exemplary embodiment the controller 308 may be configured to determine the health of the bearing 308 with a predictive bearing failure, life, and/or wear model included in a controller 308 memory (not shown), which is based on the temperature of the oil cast off.

In one embodiment, the predetermined threshold may be an average temperature of the oil cast off from the side thrust surface of each of the plurality of other connecting rods 114 of the engine 100. In such an embodiment, the controller 402 may be configured to receive signals from each of the plurality of the sensors 404 associated with the corresponding connecting rods 114. Based on these signals, the controller 402 may be further configured to determine the average temperature of the oil cast off from the side thrust surface of the fork ends 116 of the plurality of the connecting rods 114. The controller 402 may then compare the determined average temperature to that of the signal generated by the sensor 404 associated with the given connecting rod 114. One of ordinary skill in the art will appreciate that recording and monitoring of the signals from each of the sensors 404 and/or computation of the average temperature may be done on a real time basis. Alternatively, the system 400 may be activated at regular intervals to determine the health of the bearings 120. In yet another situation, the system 400 may be manually activated based on an input received from an operator through an operator control panel. Another variation may include activation of the system 400 based on reaching certain engine parameter characteristics or a change of rate of temperature that exceeds beyond a predetermined rate threshold.

In another embodiment, the predetermined threshold may be a pre-calibrated dataset or temperature map or change rate slope threshold stored in a database 406. In some embodiments, the database 406 may be a component of the controller 402. The database 406 may be any conventional or non-conventional database known in the art. The database 406 may be intrinsic or extrinsic to the engine 100. The pre-calibrated dataset may store one or more temperature values based on one or more parameters of the engine 100. For example, the dataset may include a map or a table containing a set of threshold limits of allowable bearing temperature readings corresponding to different operational speeds of the engine 100. In this situation, the controller 402 may compare the signal received from the sensor 404, which is indicative of the temperature of the oil cast off associated with the bearing 120, with that of the data retrieved from the database 406.

It should be noted that in a possible failure condition of any one or more bearings 120, the temperature of the respective failed bearing 120 may increase considerably, or rapidly, due to excessive friction, with respect to other bearings 120. As a result, the temperature of the oil cast off by the connecting rod 114 associated with the failed bearing 120 may also increase. This increase in temperature may be detected by the controller 402 based on the comparison of the determined average temperature with the temperature of the oil cast off associated with the given bearing 120. More specifically, when either the temperature or rate of change of temperature of the oil cast off exceeds the average temperature or a pre-determined rate of temperature change respectively, the controller 402 may detect an impending failure of the bearing 120 or a tendency of failure of the bearing 120.

In yet another embodiment, the controller 402 may monitor and maintain a log of the bearing temperatures of each of the plurality of the bearings 120 over a course of time or multiple operational cycles. These logs may be stored in the database 406. For example, on installation of a new set of bearings 120 or at the beginning of a new service cycle, the controller 402 may monitor and record the temperature of the bearing 120. Over various operational cycles of the bearing 120, the bearing 120 may be subjected to wear and tear. Frictional forces acting on the bearing 120 may lead to an increase in the temperature of the bearing 120. In a situation in which a set of bearings 120 are present in the system, over the course of time, the average temperature of the bearings 120 may rise. Accordingly, the controller 402 may detect the tendency of failure of the set of the bearings 402 by detecting when the temperature of each of the bearings 402 exceeds the predetermined threshold.

A variety of outputs may be provided by the system 400 in order to notify the operator of the engine 100 or a machine including the engine 100, or to command automatic remedial action in case of detection of the tendency of the failure of the bearing 120. In one embodiment, the controller 402 may be communicably coupled to a display device 408. Based on the determination of the health of the bearing 120, the controller 402 may be configured to notify the operator of the determined health of the bearing 120. The controller 402 may be configured to display visual indications to notify the operator of the determined health of the bearing 120.

These visual indications may include, but may not be limited to, any one or a combination of colored icons, text messages and/or numerical values denoting service cycle due, health and/or failure of any one or more of the plurality of the bearings 120, remaining operable life and/or end of operable life of any one or more of the plurality of the bearings 120. In one embodiment, prior to the detection of the tendency of the failure of the bearing 120, the controller 402 may display a notification indicative of a good health of the bearing 120 in the form of a relevant visual indication, like the text message or the colored icon. When the controller 402 may detect the tendency of the failure of the bearing 120, the controller 402 may change the notification displayed on the display device 408 to make the operator aware of the change in the health status of the bearing 120. For example, the contents of the text message or the color of the icon may be appropriately changed.

Alternatively, the outputs provided by the system 400 may include remedial actions based on the detection of the tendency of the failure of the bearing 120. In one embodiment, on the detection of the impending failure of the bearing 120, the controller 402 may be configured to shut off a fuel supply to the engine 100 or the cylinder 108 associated with the respective bearing 120. In another embodiment, the controller 402 may be configured to restrict a power output of the engine 100 to a predetermined value until it may be possible to stop the engine 100 based on a completion of an ongoing task.

The controller 402 may embody a single microprocessor or multiple microprocessors that includes a means for receiving signals from the components of the health determination system 400. Numerous commercially available microprocessors may be configured to perform the functions of the controller 402. It should be appreciated that the controller 402 may readily embody a general machine microprocessor capable of controlling numerous machine functions. A person of ordinary skill in the art will appreciate that the controller 402 may additionally include other components and may also perform other functionality not described herein. It should be understood that the embodiments and the configurations and connections explained herein are merely on an exemplary basis and may not limit the scope and spirit of the disclosure.

INDUSTRIAL APPLICABILITY

The bearing of the connecting rod is a critical component of the connecting rod-crankshaft assembly. Due to continuous friction during operation of the engine, the bearing tends to wear out. A worn out bearing is more prone to failure which in turn may damage and cause failure of the connecting rod-crankshaft assembly and the engine. Detecting the health and/or the tendency of failure of the bearing may enable in preventing catastrophic failure of the bearing and associated components.

The health of the bearing may be determined by detecting and/or monitoring the temperature of the oil cast off associated with the bearing, during the movement of the connecting rod. It should be noted that the health of the bearing may be determined based on the comparison of the temperature of the oil cast off with that of the predetermined threshold. The temperature of the oil cast off may be indicative of or based on a function of the temperature of the bearing. More importantly, an exact temperature of the bearing need not be determined since the tendency of the failure of the bearing may be indirectly based on the behavior of the given bearing with respect to that of other bearings in the system or the preset temperature readings. Also, rate of change of temperature of one bearing with respect to the other bearings may also be used to determine relative health of each bearing.

Figure 5:
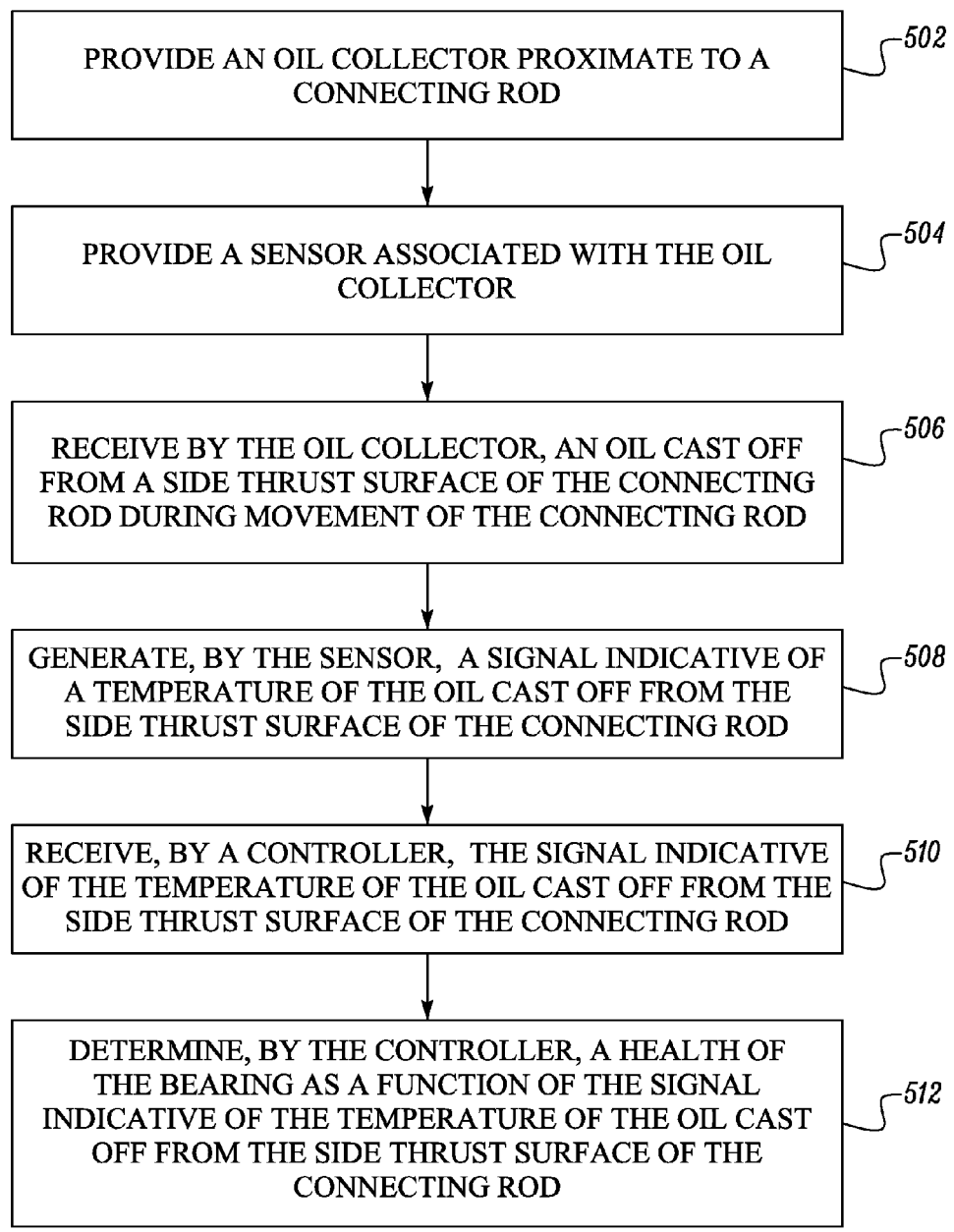
FIG. 5 is a flowchart of an exemplary method of determining the health of a bearing.

FIG. 5 illustrates a flowchart depicting an exemplary method 500 for determining the health of the bearing 120 of the connecting rod 114. At step 502, the oil collector 202 may be provided in association with each of the plurality of the connecting rods 114. More specifically, the oil collector 202 may be positioned proximate to the fork end 116 of the connecting rod 114 in order to receive the oil cast off during the downstroke and/or the upstroke movement of the connecting rod 114. At step 504, the sensor 404 may be provided in the aperture 208 at the bottom section 206 of the oil collector 202.

At step 506, during the movement of the connecting rod 114, the oil cast off from the side thrust surface of the fork end 116 of the connecting rod 114 may be received by the oil collector 202. The oil cast off received by the oil collector 202 may collect and flow through the internal channels 204 towards the bottom section 206 of the oil collector 202 due to the action of gravity, and may contact the sensor 404 provided in the aperture 208. At step 508, the sensor 404 may generate the signal indicative of the temperature of the oil cast off received from the oil collector 202.

At step 510, the controller 402 may receive the signal indicative of the temperature of the oil cast off from the sensor 404. At step 512, the controller 402 may be configured to determine the health of the bearing 120 as a function of the signal indicative of the temperature of the oil cast off from the side thrust surface of the fork end 116 of the connecting rod 114. In one embodiment, the controller 402 may be configured to compare the temperature of the oil cast off with a predetermined threshold. Based on the comparison made, the controller 402 may be configured to determine the health of the bearing 120. More specifically, the controller 402 may be configured to detect if the temperature of the bearing 120 exceeds the predetermined threshold, in order to determine an impending failure of the bearing 120. In other exemplary embodiments the controller 308 may be configured to determine the health of the bearing 120 as a function of the rate of change of temperature of the oil cast off from the side thrust surface of the fork end 116 of the connecting rod 114, or the second derivative of the temperature of the oil cast off from the side thrust surface of the fork end 116 of the connecting rod 114.

Accordingly, the controller 402 may display visual indications on the display device 408 to notify the operator of the determined health of the bearing 120. In one embodiment, prior to the detection of the tendency of the failure of the bearing 120, the controller 402 may display the notification indicative of the good health of the bearing 120 in the form of the relevant visual indication, like the text message or the colored icon. When the controller 402 may detect the tendency of the failure of the bearing 120, the controller 402 may change the notification displayed on the display device 408 to make the operator aware of the change in the health status of the bearing 120. For example, the contents of the text message or the color of the icon may be appropriately changed.

Alternatively, the outputs provided by the system 400 may include remedial actions based on the detection of the tendency of the failure of the bearing 120. In one embodiment, on the detection of the impending failure of the bearing 120, the controller 402 may be configured to shut off the fuel supply to the engine 100 or the cylinder 108 associated with the respective bearing 120. In another embodiment, the controller 402 may be configured to restrict the power output of the engine 100 to the predetermined value until it may be possible to stop the engine 100 based on the completion of the ongoing task.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for determining a health of a bearing associated with a connecting rod, the system comprising:
   an oil collector proximate to the connecting rod, the oil collector configured to receive an oil cast off from a side thrust surface of the connecting rod during movement of the connecting rod;
   a sensor associated with the oil collector, the sensor configured to generate a signal indicative of a temperature of the oil cast off from the side thrust surface of the connecting rod; and
   a controller communicably coupled to the sensor, the controller configured to:
      receive the signal indicative of the temperature of the oil cast off from the side thrust surface of the connecting rod; and
      determine the health of the bearing as a function of the signal of the temperature of the oil cast off from the side thrust surface of the connecting rod.

2. The system of claim 1, wherein the controller is configured to compare the temperature of the oil cast off from the side thrust surface of the connecting rod bearing with a predetermined threshold, and determines the health of the bearing based on the comparison.

3. The system of claim 2, wherein the predetermined threshold further includes an average temperature of the oil cast off from the side thrust surface of a plurality of other connecting rods.

4. The system of claim 1, wherein the oil collector includes a plate having a plurality of internal channels provided in an arrangement configured to direct a flow of the oil cast off from the side thrust surface of the connecting rod towards the sensor.

5. The system of claim 4, wherein the plurality of internal channels are provided in a substantially parallel and spaced part arrangement, each of the plurality of internal channels provided in fluid communication with the sensor.

6. The system of claim 4, wherein the plurality of internal channels are provided in a manner wherein the plurality of internal channels converge to form a substantially "V" shaped arrangement in fluid communication with the sensor.

7. The system of claim 1, wherein the oil collector is disposed within an engine housing and proximate to a fork end of the connecting rod.

8. The system of claim 1, wherein the predetermined threshold further includes a pre-calibrated dataset having one or more temperature values.

9. The system of claim 1, wherein the controller is further configured to detect a tendency of failure of the bearing based on the determination.

10. The system of claim 1 further comprising a display device communicably coupled to the controller, the display device configured to notify an operator of the determined health of the bearing.

11. The system of claim 1, wherein the sensor includes a thermocouple.

12. A method for determining a health of a bearing associated with a connecting rod, the method comprising:
providing an oil collector proximate to the connecting rod;
providing a sensor associated with the oil collector;
receiving, by the oil collector, an oil cast off from a side thrust surface of the connecting rod during movement of the connecting rod;
generating, by the sensor, a signal indicative of a temperature of the oil cast off from the side thrust surface of the connecting rod;
receiving, by a controller, the signal indicative of the temperature of the oil cast off from the side thrust surface of the connecting rod; and
determining, by the controller, the health of the bearing as a function of the signal of the temperature of the oil cast off from the side thrust surface of the connecting rod.

13. The method of claim 12 further comprising:
comparing, by the controller, the temperature of the oil cast off from the side thrust surface of the connecting rod bearing with a predetermined threshold; and
determining, by the controller, the health of the bearing based on the comparison.

14. The method of claim 13, wherein the predetermined threshold further includes an average temperature of the oil cast off from the side thrust surface of a plurality of other connecting rods.

15. The method of claim 13, wherein the predetermined threshold further includes a pre-calibrated dataset having one or more temperature values.

16. The method of claim 12 further comprising detecting a tendency of failure of the bearing based on the determination.

17. The method of claim 12 further comprising notifying an operator of the determined health of the bearing.

18. An engine housing comprising:
a cylinder head;
an engine block having a cylinder;
a connecting rod associated with the cylinder, the connecting rod having a bearing;
an oil collector proximate to the connecting rod, the oil collector configured to receive an oil cast off from a side thrust surface of the connecting rod during movement of the connecting rod;
a sensor associated with the oil collector, the sensor configured to generate a signal indicative of a temperature of the oil cast off from the side thrust surface of the connecting rod; and
a controller communicably coupled to the sensor, the controller configured to:
receive the signal indicative of the temperature of the oil cast off from the side thrust surface of the connecting rod; and
determine the health of the bearing as a function of the signal of the temperature of the oil cast off from the side thrust surface of the connecting rod.

19. The engine housing of claim 18, wherein the controller is configured to compare the temperature of the oil cast off from the side thrust surface of the connecting rod bearing with a predetermined threshold, and determines the health of the bearing based on the comparison.

20. The engine housing of claim 19, wherein the predetermined threshold further includes an average temperature of the oil cast off from the side thrust surface of a plurality of other connecting rods.

* * * * *